United States Patent [19]

Bourland

[11] Patent Number: 4,501,850
[45] Date of Patent: Feb. 26, 1985

[54] POLYVINYL CHLORIDE MOLDING COMPOUND

[75] Inventor: Larry G. Bourland, Downingtown, Pa.

[73] Assignee: Atlantic Richfield Company, Los Angeles, Calif.

[21] Appl. No.: 613,855

[22] Filed: May 24, 1984

[51] Int. Cl.³ .................. C08L 23/12; C08L 23/16; C08L 23/26; C08L 27/06
[52] U.S. Cl. ............................ 524/527; 525/86; 525/190; 525/192; 525/239; 525/194
[58] Field of Search ............... 525/239, 194; 524/527

[56] References Cited

U.S. PATENT DOCUMENTS

| 3,046,237 | 7/1962 | Rosenfelder et al. | 525/239 |
| 3,058,943 | 10/1962 | Gray et al. | 525/239 |
| 3,075,946 | 1/1963 | Zupic | 525/239 |
| 3,085,082 | 4/1963 | Baer et al. | 525/239 |
| 3,144,436 | 8/1964 | Greene et al. | 525/387 |
| 3,303,148 | 2/1967 | Joyner et al. | 525/222 |
| 3,390,208 | 6/1968 | Montgomery | 525/239 |
| 3,607,986 | 9/1971 | Ager et al. | 525/239 |

*Primary Examiner*—Carman J. Seccuro
*Attorney, Agent, or Firm*—Dennis M. Kozak

[57] ABSTRACT

The incorporation of a high melt flow rate propylene-based polymer additive into a PVC molding compound serves to retard the fusion rate of the PVC compound during processing.

15 Claims, No Drawings

POLYVINYL CHLORIDE MOLDING COMPOUND

This invention pertains to additives for polyvinyl chloride (PVC) plastics.

In one of its more specific aspects, this invention relates to the incorporation of a high melt flow rate propylene-based polymer additive into a PVC molding compound for the purpose of retarding the fusion rate of the PVC compound during processing.

Molding compounds comprising PVC are well known. Generally, these compounds are prepared by adding to a base PVC resin one or more components that will allow it to be processed into a finished product with desired properties and at minimum costs.

Rigid or unplasticized PVC has a relatively high melt viscosity at typical processing tempertures. The processing consequences of this high melt viscosity are: (1) high mechanical energy is required for extruder screw rotation and material transport in the molten state, and (2) excessive frictional heat develops from the shear applied during processing and elevates the stock temperature which in turn causes serious thermal stability problems. High melt viscosities or frictional heat generation during processing do not cause serious processing problems for thermoplastics which are inherently stable to shear and processing temperature. Such stable thermoplastic materials may be processed either by increasing the processing temperature which decreases melt viscosity or by designing the processing equipment to handle viscous materials. However, these options are not applicable to PVC resin due to its inherent shear and temperature instability. PVC resin will degrade during high temperature and/or high shear rate processing.

Thus, in rigid PVC compounding, lubricating additives are required to retard the fusion rate of the PVC compound and, hence, control the frictional heat buildup resulting from conventional processing techniques such as extrusion, milling, calendering and injection molding, all of which involve the application of shear to promote fusion, melt homogeneity and flow. Types of lubricants which are conventionally employed for this purpose are the paraffinic waxes, glycerine monostearate based waxes, polyethylene waxes, calcium stearamide, and ethylene bis stearamide and their mixtures. It has not, however, been the practice to incorporate a high melt flow rate propylene-based polymer additive to effect such processing improvements.

This invention provides a novel PVC compound which incorporates a high melt flow rate propylene-based polymer additive for the purpose of retarding the fusion characteristics of the PVC compound.

As used herein, the term "high melt flow rate" means a melt flow rate equal to or greater than 300 grams/10 minutes measured using A.S.T.M. D-1238-78, Condition L. All melt flow rates herein were determined using this test method.

According to this invention there is provided a moldable compound comprising a polyvinyl chloride resin and a high melt flow rate propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl.

According to this invention, there is also provided a method of producing a molded compound which comprises forming a moldable compound comprising a polyvinyl chloride resin and a high melt flow rate propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, and molding the resulting moldable compound.

Also, according to this invention, there is provided a method of retarding the fusion rate of a polyvinyl chloride molding compound comprising a polyvinyl chloride resin which method comprises incorporating into the polyvinyl chloride molding compound a high melt flow rate propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, the high melt flow rate propylene-based polymer being employed in an amount sufficient to retard the fusion rate of the molding compound upon processing.

In a preferred embodiment, the high melt flow rate propylene-based polymer additive is a high melt flow rate polypropylene.

In another preferred embodiment, the high melt flow rate propylene-based polymer additive is a high melt flow rate propylene-ethylene copolymer.

In another preferred embodiment, the high melt flow rate propylene-based polymer additive has a melt flow rate equal to or greater than 900 g/10 min.

The moldable PVC composition of this invention will be comprised, preferably, of the following components:
(a) 100 parts of a polyvinyl chloride base resin;
(b) from about 1 to about 3 phr of a stabilizer;
(c) from about 0.1 to about 10, preferably 0.5 to about 5 phr of the high melt flow rate propylene-based polymer;
(d) from about 0.5 to about 10 phr of a processing aid; and,
(e) from about 3 to about 12 phr of an impact modifier.

The polyvinyl chloride base resins which can be used in this invention are well known in the art and are selected based on the specific application. The PVC resin chosen can be a homopolymer of vinyl chloride or a copolymer of vinyl chloride with up to about 20 weight percent of a copolymerizable olefinically unsaturated comonomer, and it can be manufactured by suspension, emulsion or bulk polymerization. Reference is made to Chapter 17 "The Compounding of Polyvinyl Chloride" by N. L. Perry, *Encyclopedia of PVC* volume 2, ©1977 the teachings of which are incorporated herein by reference thereto.

To inhibit the degradation that the PVC base resin would undergo at processing temperatures, a stabilizer is added. Suitable stabilizers are well known and include tin mercaptides, tin carboxylates, barium-cadmiums, calcium-zincs and leads.

The high melt flow rate propylene-based polymer additive which is employed in this invention exhibits Newtonian flow characteristics and is an isotatic, crystalline propylene homopolymer or copolymer as previously defined. It will have a peak molecular weight of from about 15,000 to about 60,000. Suitable propylene-based polymers are prepared by the degradation of higher molecular weight propylene-based polymers and are commercially available. U.S. Pat. No. 3,144,436 teaches a method for degrading steroregular polymers and is incorporated herein by reference thereto. The high melt flow rate propylene-based polymer will have a melt flow rate equal to or greater than 300 g/10 mins., preferably equal to or greater than 900 g/10 mins.

Particularly suitable for use in this invention are the high melt flow rate propylene-based polymers designated Arvis TM resins, available from ARCO Chemical Company, division of Atlantic Richfield Company.

Arvis TM 1000 resin is a visbroken propylene homopolymer having a peak molecular weight of 47,000, a melt flow rate of 1600 g/10 min. and a melting point as determined by differential scanning calorimetry (DSC) of about 165° C.

Arvis TM 3000 resin is a visbroken 2.5 wt.% ethylene/propylene copolymer having a peak molecular weight of 42,000, a melt flow rate of 1800 g/10 min. and a melting point by DSC of about 148° C.

Arvis TM 5000 resin is a visbroken 4.5 wt.% ethylene/propylene copolymer having a peak molecular weight of 48,000, and a melting point by DSC of about 132° C.

Various processing aids can be employed and are commercially available, these are the acrylics, α-methyl styrene, styrene-acrylonitrile copolymers and chlorinated polyethylenes.

Impact modifiers are such as are conventionally employed and include acrylics, ABS resins, chlorinated polyethylenes, and the ethylene/vinyl acetate/carbon monoxide terpolymers designated Elvaloy® resin modifiers by E. I. DuPont.

Optionally, for certain specific applications, the PVC compound can be formulated to also include various pigments, fillers, antistatic agents, reoderants, dulling or flattening agents and the like.

The invention is demonstrated by the following examples.

EXAMPLES 1-6

A series of six (6) PVC molding compounds was prepared by intensive dry mixing, individually, the ingredients set forth in Table I.

TABLE I

| Ingredient | Example No. | | | | | |
|---|---|---|---|---|---|---|
| | 1 (control) | 2 | 3 | 4 | 5 | 6 |
| polyvinyl chloride resin[1] | 100 | 100 | 100 | 100 | 100 | 100 |
| stabilizer[2] | 1.0 | 1.0 | 1.0 | 1.0 | 1.0 | 1.0 |
| HMFR additive[3] | 0 | 0.25 | 0.5 | 1.0 | 2.0 | 3.0 |

[1]Tenneco 200, inherent viscosity = 0.8
[2]Mark 1900 mercapto-tin stabilizer (Argus Chemical Div. of Witco Chemical Corp.)
[3]HMFR = high melt flow rate; 1:1 ratio of Arvis 3000 resin and Arvis 5000 resin
Compositions in parts per 100 parts of PVC resin (phr)

Brabender fusion data for the six PVC molding compounds (Examples 1-6) were obtained by separately introducing a 69 gram charge of each of the six compounds into a Brabender mixing bowl equipped with No. 6 roller blades and mixing at 170° C. and 64 rpm. Table II shows the resulting Brabender fusion data.

TABLE II

| Compound of Example No. | Fusion Time* (Minutes) | Ultimate Torque (M-g) |
|---|---|---|
| 1 (control) | 0.5 | 3,150 |
| 2 | 0.8 | 2,800 |
| 3 | 1.3 | 2,550 |
| 4 | 1.8 | 2,300 |
| 5 | 1.7 | 1,000 |
| 6 | 1.8 | 1,950 |

*time required to reach maximum torque

EXAMPLES 7-10

A series of four (4) PVC molding compounds was prepared by intensive dry mixing individually the ingredients set forth in Table III.

TABLE III

| Ingredient | Example No. | | | |
|---|---|---|---|---|
| | 7 (control) | 8 | 9 | 10 |
| polyvinyl chloride resin[1] | 100 | 100 | 100 | 100 |
| stabilizer[2] | 1.0 | 1.0 | 1.0 | 1.0 |
| HMFR additive[3] | 0 | 1.0 | 2.0 | 3.0 |
| processing aid[4] | 1.0 | 1.0 | 1.0 | 1.0 |
| impact modifier[5] | 6.0 | 6.0 | 6.0 | 6.0 |

[1]Tenneco 200
[2]Mark 1900 mercapto-tin stabilizer
[3]1:1 ratio of Arvis 3000 resin and Arvis 5000 resin
[4]Acryloid ® K120N processing aid (Rohm & Haas)
[5]Acryloid ® KM 323B impact modifier (Rohm & Haas)
Compositions in parts per 100 parts of PVC resin (phr)

Brabender fusion data for the four PVC molding compounds (Examples 7-10) were obtained by separately introducing a 69 gram charge of each of the four compounds into a Brabender mixing bowl equipped with No. 6 rollers blades and mixing at 170° C. and 64 rpm. Table IV shows the resulting Brabender fusion data.

TABLE IV

| Compound of Example No. | Fusion Time* (Minutes) | Ultimate Torque (M-g) |
|---|---|---|
| 7 (control) | 0.4 | 3,600 |
| 8 | 1.0 | 2,300 |
| 9 | 1.1 | 1,900 |
| 10 | 1.9 | 2,075 |

*time required to reach maximum torque

EXAMPLES 11-13

For comparison, Examples 8, 9 and 10 were reformulated to exclude the 1.0, 2.0 and 3.0 phr of the HMFR additive and to include in place thereof 1.0, 2.0 and 3.0 phr (Examples 11, 12 and 13, respectively) of a conventional lubricant comprised of a 1:1 ratio of calcium stearate and ethylene bis-stearamide wax.

Brabender fusion data were obtained following the above procedure and are shown in Table V.

TABLE V

| Compound of Example No. | Fusion Time* (Minutes) | Ultimate Torque (M-g) |
|---|---|---|
| 11 | 0.2 | 3,200 |
| 12 | 0.3 | 2,950 |

TABLE V-continued

| Compound of Example No. | Fusion Time* (Minutes) | Ultimate Torque (M-g) |
|---|---|---|
| 13 | 0.9 | 2,775 |

*time required to reach maximum torque

Comparing the data of Tables IV and V shows that the PVC compounds of the invention (Examples 8, 9 and 10) exhibit marked improvements in fusion rates as compared to the PVC compounds not according to the invention, that is, Examples 11, 12 and 13.

Example 8 was found to have fusion time four times that of Example 11.

Example 9 was found to have a fusion time of three and one half times that of Example 12.

And, Example 10 was found to have a fusion time over twice that of Example 13.

It will be evident from the foregoing that various modifications can be made to this invention. Such, however, are considered as being within the scope of the invention.

What is claimed is:

1. A molding compound comprising a polyvinyl chloride resin and from about 0.1 to about 10 parts per each 100 parts of polyvinyl chloride resin of a high melt flow rate isotactic propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, said high melt flow rate propylene based polymer having a melt flow rate of at least 300 grams/10 minutes measured using ASTMD-1238-79 Condition L.

2. The molding compound of claim 1 in which said high melt flow rate propylene-based polymer has a melt flow rate of at least 900 grams/10 minutes measured using A.S.T.M. D-1238-79 Condition L.

3. The molding compound of claim 1 in which said high melt flow rate propylene-based polymer has a peak molecular weight of from about 15,000 to about 60,000.

4. The molding compound of claim 1 in which said high melt flow rate propylene-based polymer is a propylene homopolymer.

5. The molding compound of claim 1 in which said high melt flow rate propylene-based polymer is a propylene-ethylene copolymer.

6. The molding compound of claim 1 comprising a stabilizer.

7. The molding compound of claim 1 comprising a processing aid.

8. The molding compound of claim 1 comprising an impact modifier.

9. The molding compound of claim 1 in which said high melt flow rate propylene-based polymer is employed in an amount within the range of from about 0.5 to about 5 parts per each 100 parts of polyvinyl chloride resin.

10. The molding compound of claim 1 in which said polyvinyl chloride resin is a copolymer of vinyl chloride with up to about 20 weight percent of a copolymerizable olefinically unsaturated comonomer.

11. A method of retarding the fusion rate of a polyvinyl chloride molding compound comprising a polyvinyl chloride resin which method comprises incorporating into the polyvinyl chloride molding compound a high melt flow rate isotactic propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, the high melt flow rate propylene-based polymer being employed in an amount from about 0.1 to about 10 parts per each 100 parts of polyvinyl chloride resin so as to retard the fusion rate of the molding compound upon processing, said high melt flow rate propylene based polymer having a melt flow rate of at least 300 grams/10 minutes measured using ASTMD-1238-79 Condition L.

12. A method of producing a molded compound which comprises forming a molding compound comprising a polyvinyl chloride resin and from about 0.1 to about 10 parts per each 100 parts of polyvinyl chloride resin of a high melt flow rate isotactic propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, and molding the resulting compound, said high melt flow rate propylene based polymer having a melt flow rate of at least 300 grams/10 minutes measured using ASTMD-1238-79 Condition L.

13. The method of claim 12 comprising incorporating a stabilizer into the molding compound.

14. The method of claim 12 comprising incorporating a processing aid into the molding compound.

15. The method of claim 12 comprising incorporating an impact modifier into the molding compound.

* * * * *